Sept. 12, 1961

L. S. WOOD 2,999,721

HYDRAULIC STABILIZERS FOR TILTING
TRUCK OR TRAILER DUMP UNITS

Filed May 5, 1958

INVENTOR.
LOUIS S. WOOD
BY
Everett G. Wright
ATTORNEY

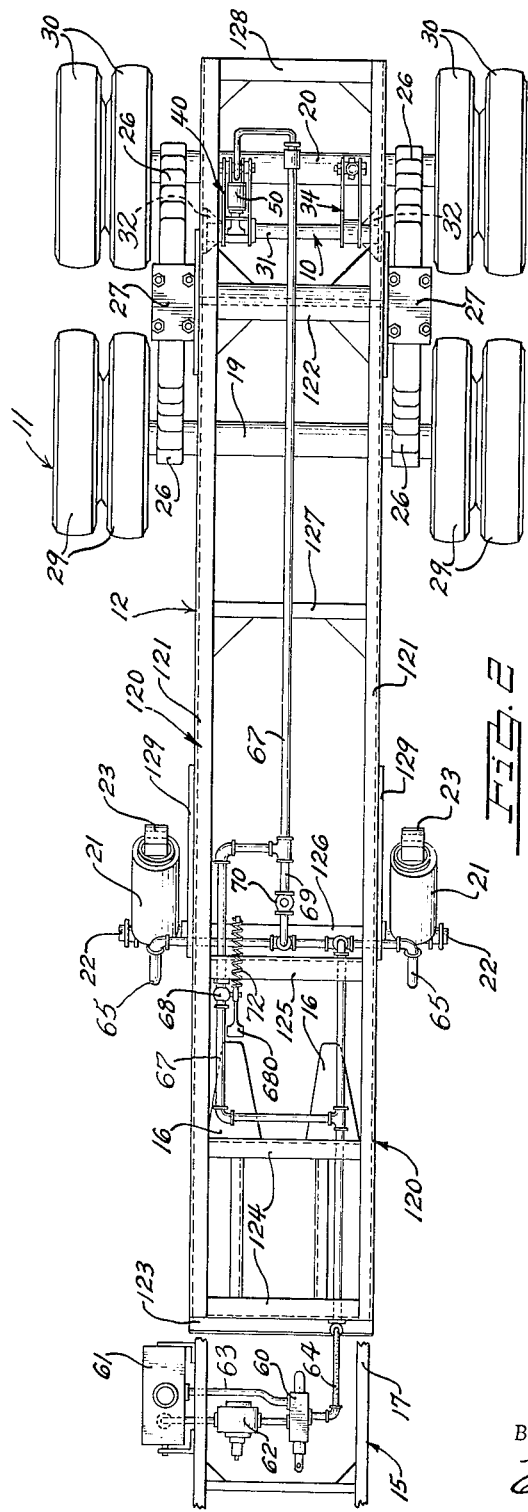

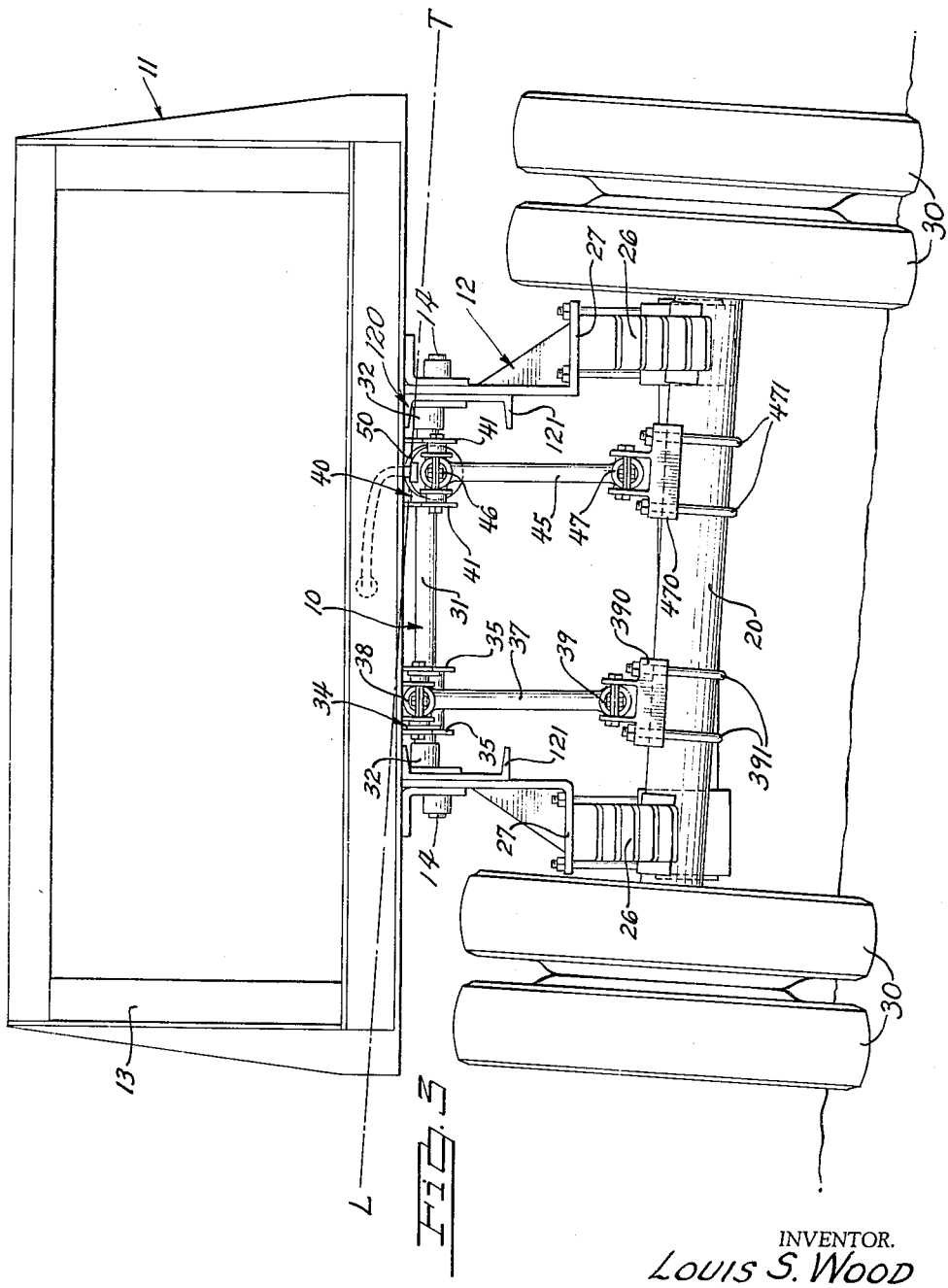

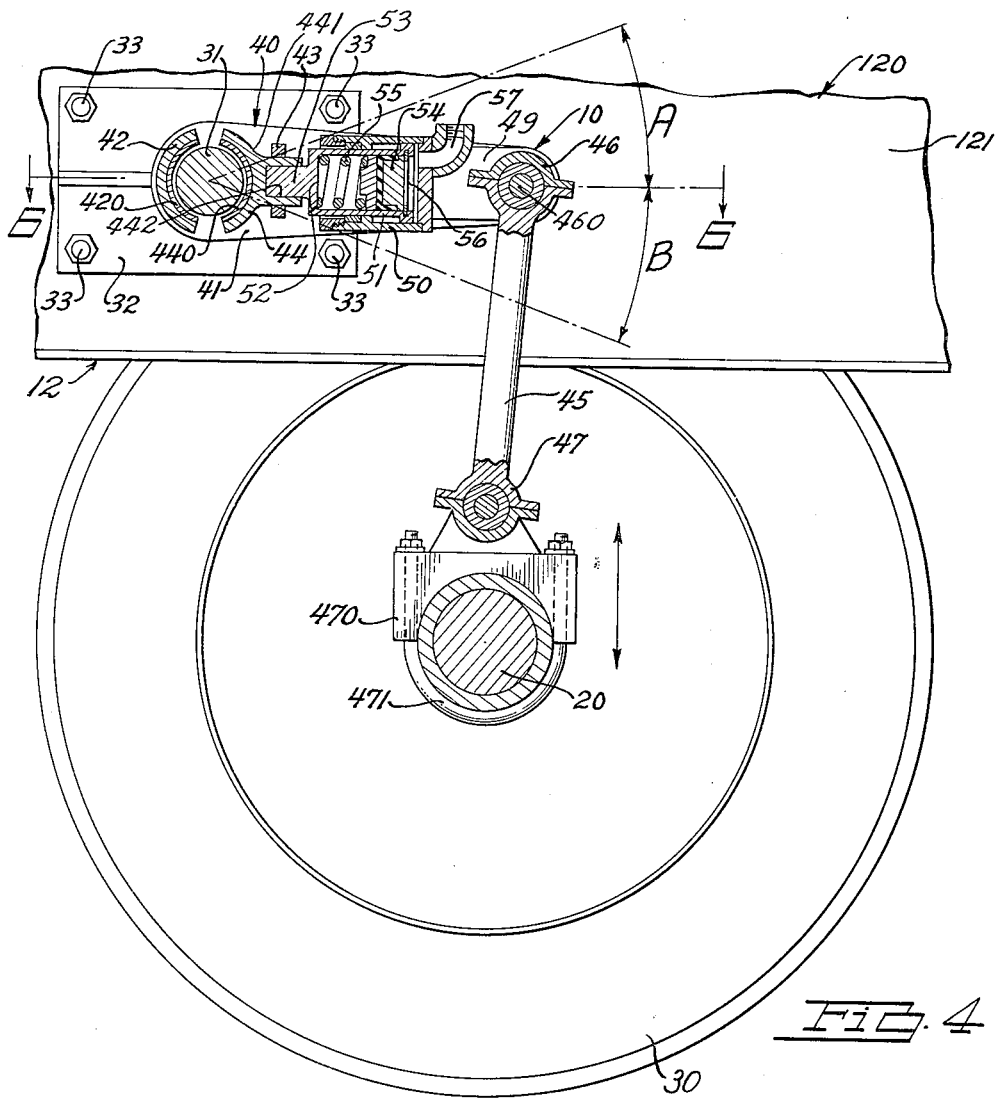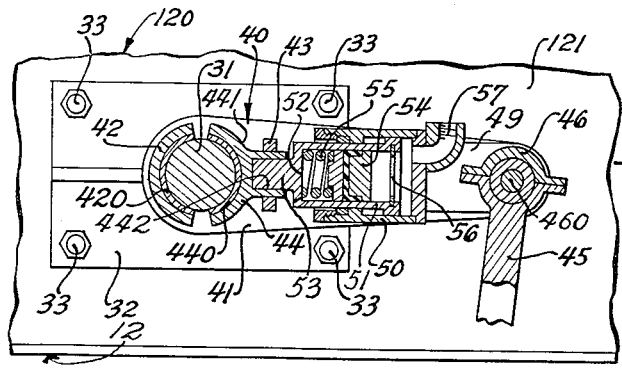

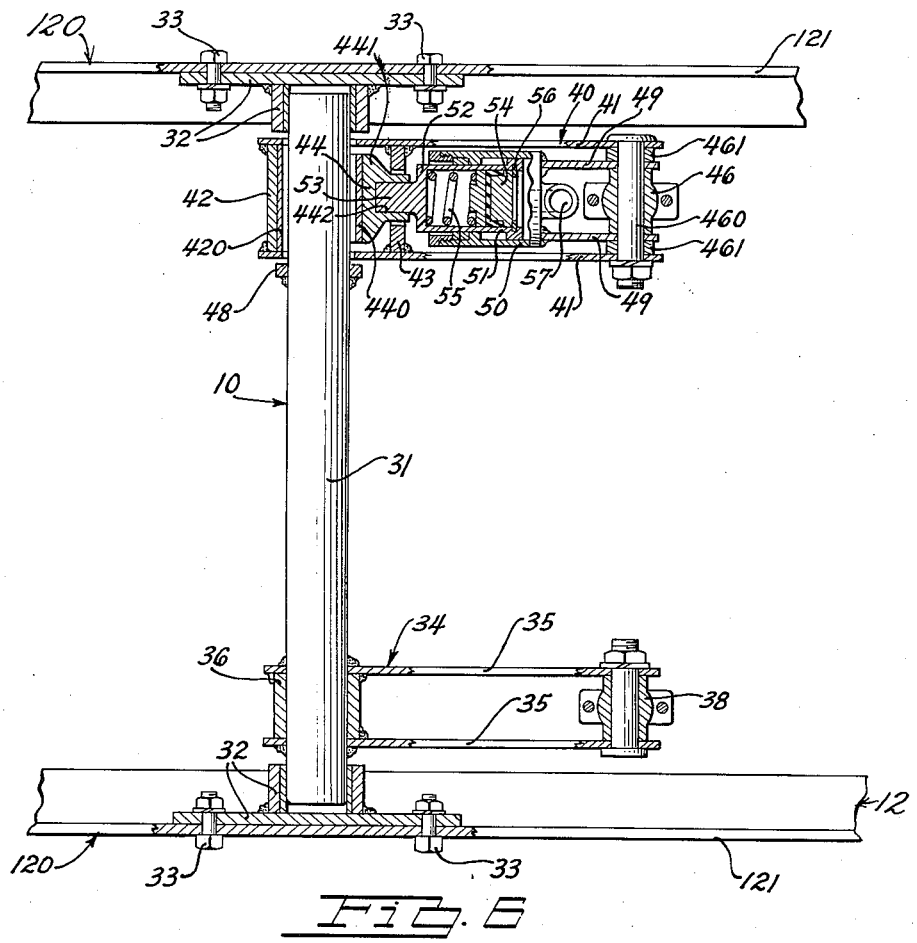

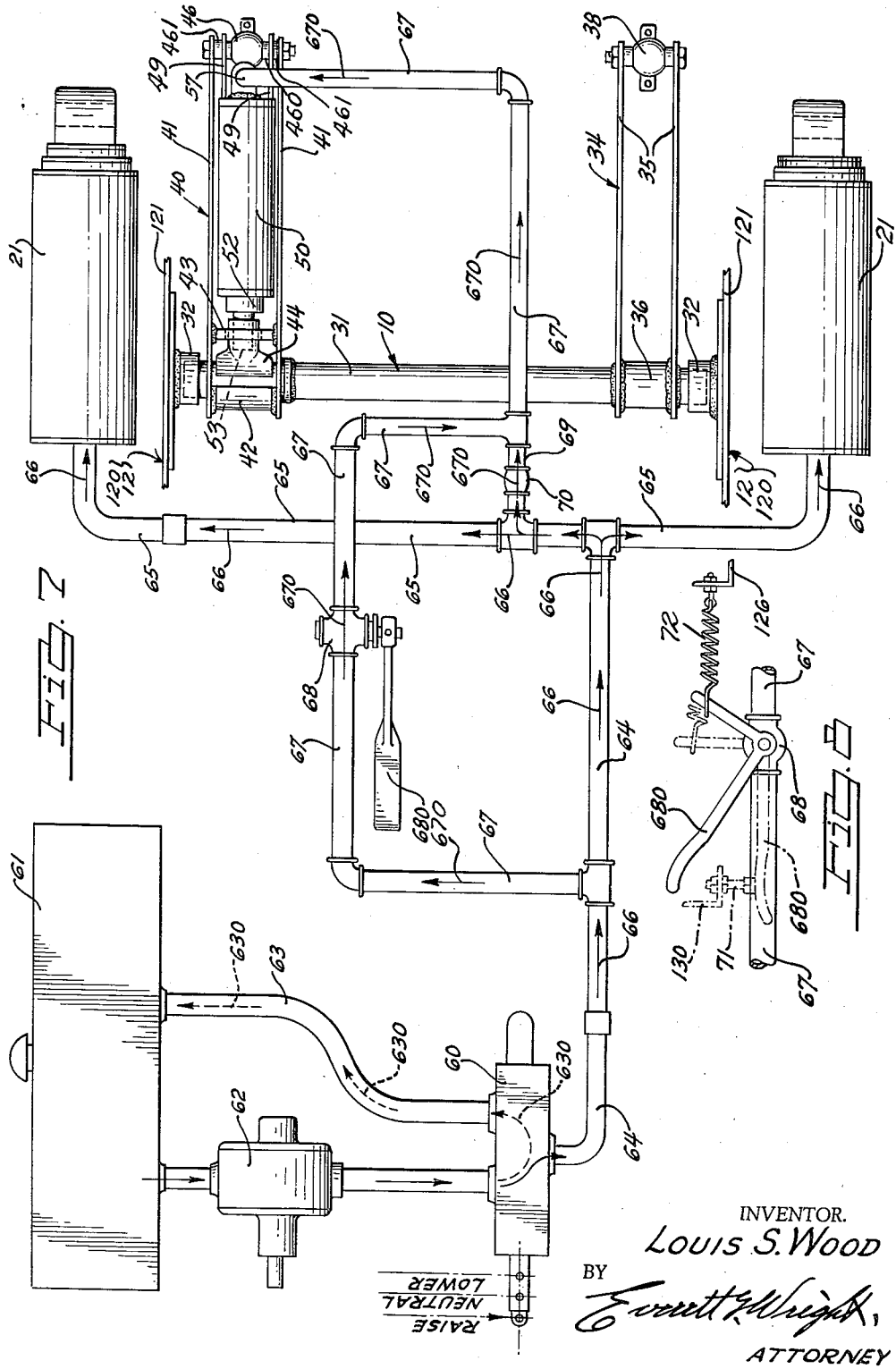

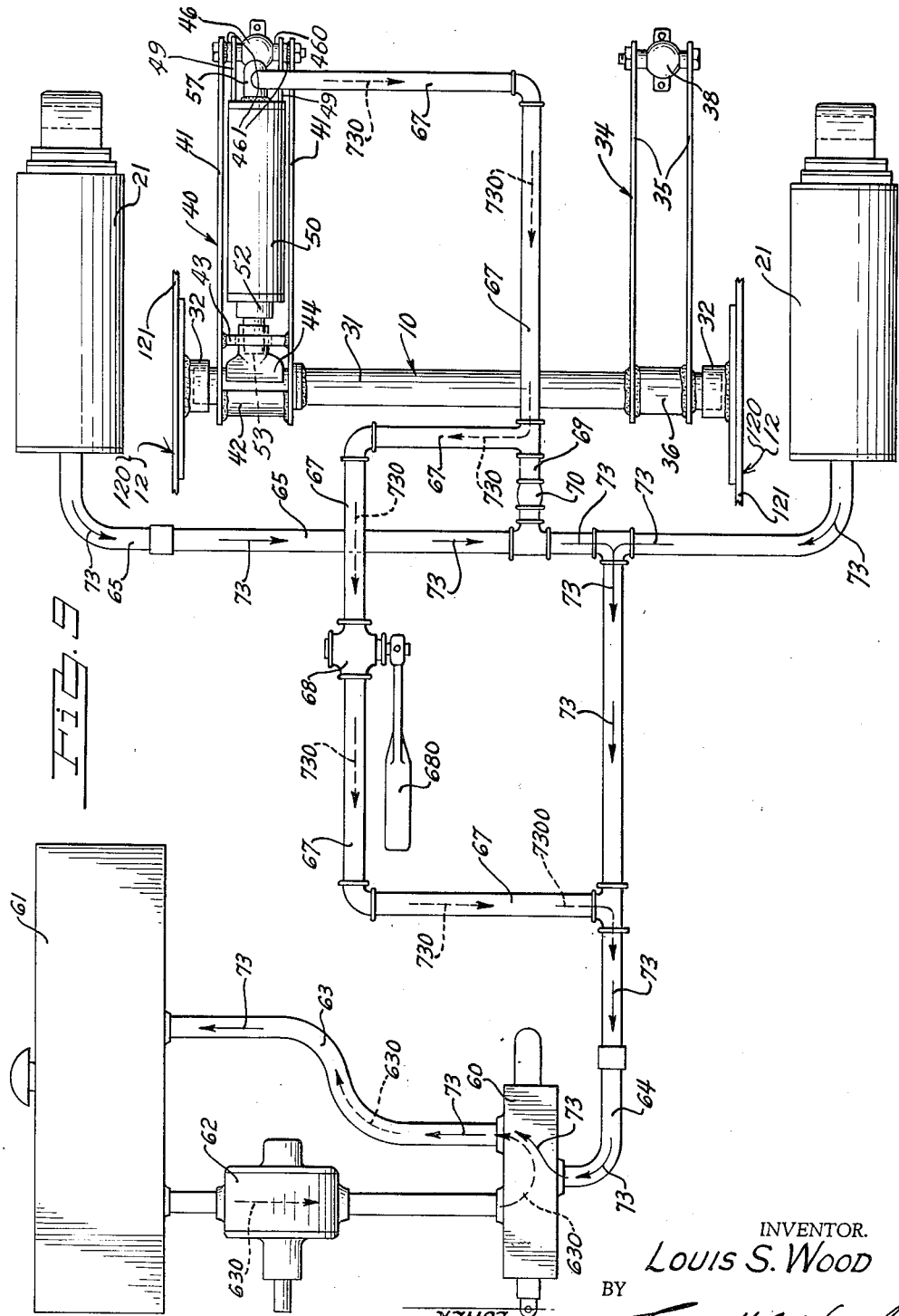

United States Patent Office 2,999,721
Patented Sept. 12, 1961

2,999,721
HYDRAULIC STABILIZERS FOR TILTING TRUCK
OR TRAILER DUMP UNITS
Louis S. Wood, 1605 Grant Blvd., Findlay, Ohio
Filed May 5, 1958, Ser. No. 733,035
9 Claims. (Cl. 298—17)

This invention relates to hydraulic means for stabilizing dump trucks or trailers during the dumping thereof, particularly when the truck or trailer is being dumped when on a laterally uneven and/or soft terrain.

In dump bodies of trucks or trailers where the terrain is uneven, contains chuck holes or is soft in spots causing the rear axle or axles of the vehicle to tilt laterally, the lateral center of gravity of the load at the rear axle or axles is generally maintained substantially laterally central in respect to the truck body by the springs mounting the chassis on the said rear axle or axles. In other words, the body mounting springs tend to maintain the truck body level and the center of gravity of the load central, all within the capacity of the springs so to do. However, when the dump body is elevated hydraulically for dumping in the conventional manner about a transverse pivot at the rear of the frame, the center of gravity of the load shifts rearwardly and upwardly increasing the rear axle loading and the rear tire-to-ground loading, particularly when the dump body is pivoted upwardly prior to and during the initial part of the dumping cycle thereof. When the terrain is softer under one side of the truck than the other, the increased tire-to-ground loading on that side of the truck causes the truck to tilt to that side shifting the center of gravity of the load laterally and ofttimes causing overturning of the truck or requiring the load to be dumped somewhat remote from its preferred dumping location with the result that, in many instances, extra bulldozing or dump leveling costs are incurred.

With the foregoing in view, the primary object of this invention is to incorporate in a dump truck or dump trailer equipped with a conventional pivoted dump body an improved and effective means for locking the chassis (and body thereon) in the angular attitude it assumes in respect to the angular attitude of the rear axle or axles at the initial pivoting of the dump body, and, at the same time, permit spring action between the axle and the chassis, and lessen the likelihood of excessive lateral tilting or listing of the rear portion of the dump truck or dump trailer during dumping.

Another object of the invention is to provide means for automatically locking the axle and chassis of a dump truck in the angular relationship assumed thereby at the initial elevating of a conventional rear pivoted dump body to provide truck stability when and as the said dump body is further elevated for dumping or spreading of the load during slow forward travel of the dump truck.

A further object of the invention is to provide a hydraulically operated interlock means at the rear axle of a dump truck or dump trailer and the chassis thereof engageable automatically responsive to the actuation of the hydraulic pistons conventionally employed to tilt or lift a pivoted dump body for dumping or spreading its load therefrom, which interlock means will maintain the axle-chassis lateral angular attitude assumed at the rear axle or axles of the dump truck or trailer at the beginning of the dumping cycle thereof and all during the said dumping cycle.

Other objects of the invention will become apparent by reference to the following detailed description taken in connection with the accompanying drawings, in which:

FIG. 2 is a plan view of the dump trailer shown in FIG. 1 with the dump body removed, also showing a fragmentary portion of the tractor chassis and hydraulic stabilizer mechanism carried thereby.

FIG. 3 is a rear elevational view of a dump trailer embodying the invention with the rear axle tilted as when traveling over uneven terrain.

FIG. 4 is a longitudinal sectional view of a hydraulic stabilizer unit embodying the invention employed to lock the rear axle in any transverse angular relationship it may assume with respect to the chassis attitude, the said hydraulic stabilizer unit being in its unlocked position.

FIG. 5 is a longitudinal view similar to FIG. 4 except that the said hydraulic stabilizer unit is in its locked position.

FIG. 6 is a horizontal sectional view taken substantially on the line 6—6 of FIG. 4.

FIG. 7 is a diagrammatic view showing the hydraulic circuit preferably employed in the illustrative embodiment of the invention, the pressure flow occurring during the dump body lifting and axle locking cycle of operation of the hydraulic stabilizer means being indicated therein.

FIG. 8 shows the body closed accumulator valve in its closed position assumed when the dump body is elevated from the chassis.

FIG. 9 is a diagrammatic view showing the hydraulic circuit and pressure flow occurring when the dump body is being lowered but with the axle still locked.

Figure 1:
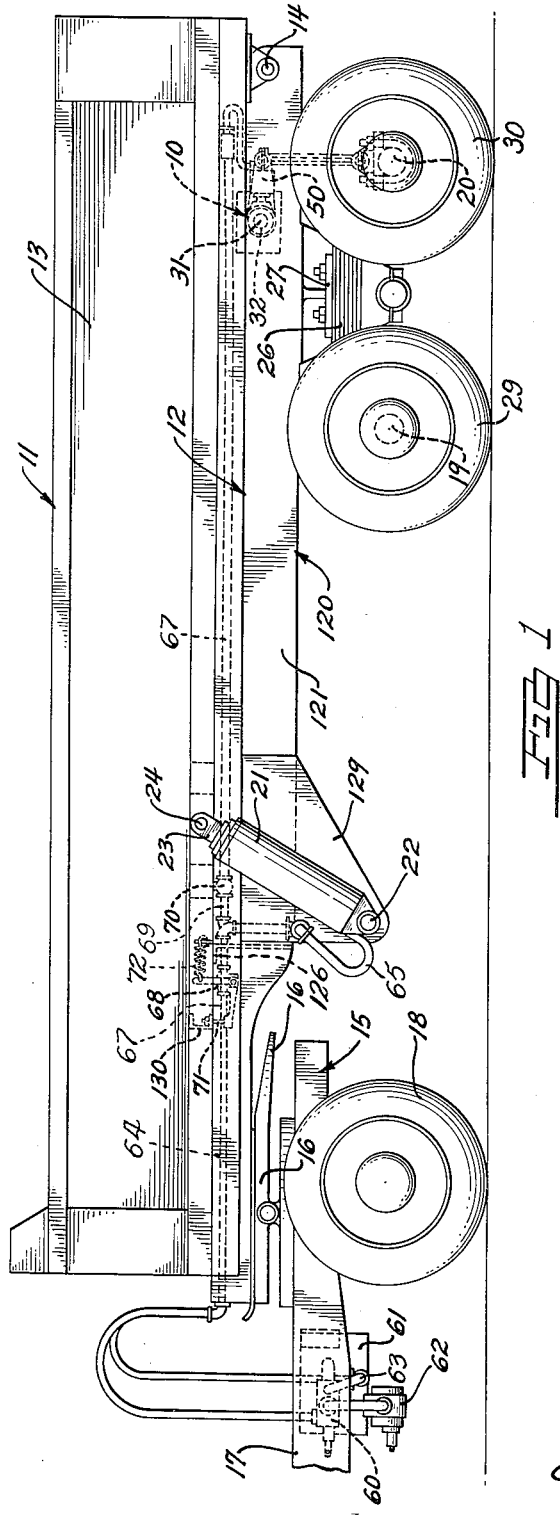
FIG. 1 is a side elevational view of a dump trailer equipped with stabilizer means embodying the invention, a portion of the tractor unit being shown.

Although the particular hydraulic stabilizer means of the invention as disclosed herein as applied to one of dual rear axles of a dump trailer, it is equally applicable to dump trucks and dump trailers having both dual and single rear axles, and it is intended that this disclosure and the claims hereof be so interpreted. Furthermore, if desired, the axle-to-frame lateral angular relationship locking mechanism of the invention may be applied to either side of a rear axle or to either side of either or both axles of tandem rear axles. Also, although it is preferable that the hydraulic axle lock mechanism of the invention be actuated and employed during the tilting or dumping of the dump body, it is obvious that the said mechanism may also be actuated and employed at other times if found desirable. However, under normal dump truck or dump trailer operations, the embodiment of the invention disclosed is preferably employed to provide the added safety required under most hazardous dumping conditions.

Referring now to the drawings wherein like reference numerals refer to like and corresponding parts throughout the several views, a hydraulic stabilizer unit 10 embodying the invention is disclosed as applied to a dual or tandem rear axle dump trailer 11 having a chassis 12 including a frame 120, dual wheeled rear axles 19 and 20, and spring means 26 supporting said frame at each side of said rear axles 19 and 20. A dump body 13 is pivotally mounted on said frame 120 by means of a transverse rear pivot 14. The said dump trailer 11 is preferably towed by a tractor 15 to which it is coupled by a conventional coupling 16. The rear portion of the chassis 17 of the tractor 15 including its rear wheels 18 are shown in FIG. 1. The said stabilizer unit 10 is shown throughout the drawings applied to the rear axle 20 of dual rear axles 19 and 20 of the said dual or tandem rear axle dump trailer 11.

In the dump trailer 11 employed for the purpose of illustrating the invention, the dump body 13 is raised upwardly and then lowered downwardly at its forward end about the said transverse pivot 14 at the rear of the frame 120 of the trailer chassis 12 by such suitable means as a pair of hydraulic cylinders 21 each connected at its lower end to a gusset 129 of the trailer frame 120 by a pivot 22. This raising and lowering of the dump body 13 constitutes a dumping cycle during which earth, sand, gravel, stone or other cargo is dumped from the said dump body. The upper end of the ram or piston 23 of each of the said hydraulic cylinders 21 is pivotally connected by a pivot 24 to the said dump body 13. An engine driven hydraulic pump 62 preferably mounted on the chassis 17 of the tractor 15 is employed to provide fluid under hydraulic pressure for raising or tilting the said dump body 13 for dumping a load therefrom. The raising and lowering of the said dump body 13 is preferably accomplished under control of manually operated hydraulic control valve 60 and a hydraulic circuit of which the said hydraulic pump 62 is an element, all as hereinafter described in detail.

The frame 120 of the chassis 12 of the dump trailer 11 is mounted at its rear end on the tandem rear axles 19 and 20 by means of conventional leaf springs 26 fixed at their centers to bolsters 27. The said bolsters 27 are fixed to and cantilevered from the side members 121 of the said frame 120 opposite its main transverse cross member 122. Other frame cross members 123, 124, 125, 126 and 127 maintain the said frame side members 121 in their proper lateral spaced relationship.

With the foregoing spring suspension, the tandem rear axles 19 and 20 are free to float or tilt laterally with respect to the frame 120 independently of each other when the dual wheels 29 and 30 respectively mounted thereon pass over uneven terrain as the dump trailer 11 is towed by the tractor 15. Thus, within certain load limits for which the leaf springs 26 are designed, the frame 120 of the chassis 12 of the dump trailer 11 and the dump body 13 thereon are maintained generally laterally level as shown in FIG. 3 when the said dump trailer 11 is towed over somewhat uneven terrain. The above described situation also applies when single axle trailers or dual axle trucks are driven over rough terrain. However, if and when the rear axle loading is at or near capacity and the terrain over which a trailer or truck is driven is extremely uneven or has deep chuck holes therein, the frame 120 of the chassis 12 will tilt laterally downwardly at the low side of the terrain as indicated by the line dot and dash L-T in FIG. 3. Under such conditions the said lateral tilting of the frame 120 of the chassis 12 is aggravated by the load in the dump body 13, particularly when the dump body 14 is raised about its rear transverse pivot 14 for dumping. As the said frame 120 of the chassis 12 tilts more and more laterally, the center of gravity of the load shifts laterally as the dump body 13 is raised, and the tendency for the dump trailer 11 to overturn ofttimes becomes acute. To avoid this increased tendency of a dump trailer 11 (or dump truck) to overturn during dumping, a hydraulic stabilizing unit 10 embodying the invention may be applied to the rear axle 20 thereof.

The hydraulic stabilizer unit 10 of the invention is best shown in FIGS. 4, 5 and 6, and consists of a horizontal freely turnable lock shaft 31 extending transversely between the longitudinal side members 121 of the frame 120 of the chassis 12 preferably mounted in flanged sleeve bearings 32 secured by bolts 33 to the inner face of each of the said side frame members 121 forward of the rear axle 20 of the dual tandem axles 19 and 20. A lock arm 34 consisting of a pair of arm members 35 and a spacer collar 36 is fixed by welding or the like in cantilever relationship to the said lock shaft 31 adjacent one longitudinal frame member 121, the said lock arm 34 normally extending in a rearwardly disposed relationship from said lock shaft 31. The free end of the said lock arm 34 is connected to the rear axle 20 by a generally vertically disposed link arm 37 employing an upper universal joint 38 between the free end of the lock arm 34 and the link arm 37 and a lower universal joint 39 between the said link arm 37 and the rear axle 20. The said lower universal joint 39 is provided with a mounting block 390 which is secured to the said rear axle 20 by U-bolts 391.

As best shown in FIG. 6, a locking arm 40 consisting of a pair of arm members 41, a forward fixed shoe 42, a spacer 43 and a locking shoe 44 is mounted in turnable relationship around the said lock shaft 31 adjacent the other longitudinal frame member 121 on arcuate bearings 420 and 440 carried by the said fixed shoe 42 and the locking shoe 44 respectively. The said locking arm 40 normally extends rearwardly from the lock shaft 31 and is connected at its outer end to the rear axle 20 by a generally vertically disposed link arm 45 employing an upper universal joint 46 between the locking arm 40 and the link arm 45 and a lower universal joint 47 between the link arm 45 and the rear axle 20. The said locking arm 40 is maintained laterally on the lock shaft 31 between the end face of the adjacent sleeve bearing 32 supporting the lock shaft 31 and a collar 48 welded on the said lock shaft 31. The lower universal joint 47 is provided with a mounting block 470 which is secured to the rear axle 20 by the U-bolts 471.

On the upper transverse pivot 460 of the upper universal joint 46 connecting the outer end of the locking arm 40 to the link arm 45 is pivotally mounted a pair of cylinder supporting arms 49 onto the forward ends of which is welded a hydraulic locking cylinder 50 having a hollow piston 51 therein terminating with a solid end 52 including a central pin 53 which telescopes into a bore or pocket 442 formed in a boss 441 extending rearwardly from the locking shoe 44 and through the spacer 43. Suitable washers 461 disposed on the transverse pivot 460 of the said upper universal joint 46 maintain the said hydraulic locking cylinder 50 laterally central between the locking arm members 41 of the said locking arm 40. Within the said hollow piston 51 is mounted an inner reciprocating piston head 54 which is spring urged by a heavy spring 55 toward a retainer ring 56 which limits the outward movement of the said reciprocating piston head 54 and prevents the said spring 55 from pushing the said piston head 54 out of the hollow piston 51. This piston construction causes the hydraulic locking cylinder 50 to function both as a locking cylinder and as a hydraulic accumulator for the purpose hereinafter described. The said locking cylinder 50 is provided with a suitable fitting 57 to which a hydraulic pressure line may be connected. FIGS. 4 and 6 show the hydraulic locking cylinder 50 and locking arm 40 of the hydraulic stabilizer 10 in an unlocked position, and FIG. 5 shows the said locking cylinder 50 and locking arm 40 in a locked position.

During the normal driving of the dump tractor 15 and trailer 11, no hydraulic fluid under pressure is applied to the hydraulic locking cylinder 50, and frame 120 and the rear axle 20 of the chassis 12 of the trailer 11 are free to float with respect to each other in their normal manner on the leaf springs 26. When the said hydraulic locking cylinder 50 is not actuated, the upward or downward movement of one end of the axle 20 with respect to the frame 120 causes the lock shaft 31 to turn in its bearings 32 responsive to an upward or downward movement of the link arm 37 disposed between the said rear axle 20 and the lock arm 34. Also, when the hydraulic locking cylinder 50 is not actuated, the upward or downward movement of the other end of the axle 20 with respect to the frame 120 causes the pivoted locking arm 40 to pivot upwardly or downwardly about the lock shaft 31 within the arcs A and B indicated in FIG. 4 responsive to an upward or downward movement of the link arm 45 disposed between the said rear axle 20 and the said pivoted locking arm 40. Thus, the hydraulic stabilizer unit 10 is inoperative as a stabilizing device when the locking cylinder 50 is not actuated, and the rear axle 20 floats normally in respect to the frame 120 of the chassis 12 on the leaf springs 26 tilting laterally as required when the rear wheels 30 at each end of the said rear axle 20 follow the terrain over which the dump trailer 11 travels.

Whenever a load in the dump trailer 11 is to be dumped by the raising of the dump body 13 with respect to the frame 120 of the chassis 12 about its transverse pivot 14, hydraulic fluid under pressure is supplied to the body lifting hydraulic cylinders 21. Simultaneously, hydraulic fluid under pressure is supplied to the hydraulic locking cylinder 50 of the hydraulic stabilizing unit 10, and the piston 51 of the said cylinder 50 moves the locking shoe 44 into contact with the lock shaft 31 and locks the locking arm 40 in the angular relationship it has assumed with respect to the said lock shaft 31 responsive to the lateral tilting of the rear axle 20 with respect to the frame 120 of the chassis 12 at the time the dump body 13 begins to raise about its transverse pivot 14. The said lock arm 34 fixed to the lock shaft 31 and the locking arm 40 normally turnable with respect to the said lock shaft 31 are now firmly locked in the angular relationship about the lock shaft 31 which they assumed responsive to the lateral tilting of the rear axle 20 with respect to the frame 120 of the chassis 12 at the time the dumping cycle of the dump body 13 was initiated.

The said hydraulic stabilizer unit 10 thusly locks the frame 120 of the chassis 12 and the dump body 13 thereon in the particular lateral angular attitude assumed by them with respect to the rear axle 20 upon the initial pivoting of the dump body 13 for dumping. The said stabilizer unit 10 maintains the said lateral angular attitude of the said frame 120 of the chassis 12 and dump body 13 with respect to the rear axle 20 all during the dumping cycle of the said dump body 13. When the said rear axle 20 and the frame 120 of the chassis 12 are locked in a lateral angular relationship to each other as above described, the rear axle 20 is nevertheless permitted to float up and down on the leaf 26 springs, but only in the angular relationship to the frame 120 of the chassis 12 into which the said rear axle is locked. This prevents excessive lateral tilting of the frame 120 of the chassis 12 and dump body 13 thereon with respect to the rear axle 20 when and as the dump body 13 is raised and the center of gravity of the load therein shifts rearwardly and laterally during the dumping cycle of the said dump body 13. Upon return of the dump body 13 to its normal position on the frame 120 of the chassis 12, the hydraulic fluid under pressure supplied to the locking cylinder 50 is released, and the rear axle 20 floats with respect to its springs 26 in its normal manner.

A hydraulic circuit preferably employed to raise and lower the dump body 13 about its transverse pivot 14 at the rear of the frame 120 of the chassis 12 for dumping a load from the dump trailer 11 and to lock the hydraulic stabilizer unit 10 during the dumping of a load from the said dump trailer 11 is shown in FIGS. 2, 7, 8, 9 and 10, FIG. 2 showing the generally preferred location of the elements of the hydraulic circuit on the chassis 12 of the dump trailer 11 embodying the invention. Obviously, other hydraulic circuits may be used, and it is not intended to limit the scope of this invention to the particular hydraulic circuit shown for illustrative purposes.

Referring now to FIGS. 7 and 8, the particular hydraulic circuit shown for use in connection with the disclosed illustrative embodiment of the invention includes therein a three position manually operated hydraulic control valve 60 having a Raise position, a Neutral position and a Lower position. Hydraulic fluid from a reservoir 61 is pumped by an engine operated pump 62 through the said control valve 60 and back to the reservoir 61 through the return line 63 when the said control valve 60 is in its central or Neutral position, which flow is indicated by the dashed line arrows 630 in FIG. 7.

When the hydraulic control valve 60 is moved to its Raise position as shown in FIG. 7, hydraulic fluid under pressure is pumped from the reservoir 61 by the pump 62, through the control valve 60 through the main pressure line 64 and branch pressure lines 65 to the dump body lifting hydraulic cylinders 21. This actuates the said body lifting cylinders 21 and raises the dump body 13 about its transverse pivot 14 to dump a load therefrom. The said flow of hydraulic fluid to dump the dump body 13 is indicated by the full line arrows 66 in FIG. 7. Simultaneously, hydraulic fluid under pressure is also forced from the main pressure line 64 to the stabilizer unit 10 through a stabilizer pressure line 67 into which a stabilizer control valve 68 is interposed. At the same time, hydraulic fluid under pressure is forced through a jumper pressure line 69 running from a branch pressure line 65 to the stabilizer pressure line 67. A check valve 70 is interposed in the jumper pressure line 69 to prevent any back flow of hydraulic fluid therethrough. The said flow of hydraulic fluid under pressure to the stabilizer unit 10 is shown by the full line arrows 670 in FIG. 7.

When the dump body 13 is in its fully lowered position and is resting on the frame 120 of the chassis 12, an adjustable pin 71 carried by a dump body member 130 located near the front end of the dump body 13 is in contact with the operating lever 680 of the stabilizer control valve 68 to open the same as best shown by the dot and dash lines in FIG. 8. The said stabilizer control valve 68 is biased to its closed position by a tension spring 72 connected to its operating lever 680 and a chassis member 126 as shown by the full lines in FIG. 8. When the dump body 11 begins to raise upwardly from the frame 120 of the chassis 12 around its transverse pivot 14, the pin 71 carried by the said dump body 11 raises, and the stabilizer control valve 68 is spring closed as indicated by the full lines in FIG. 8. The said stabilizer control valve 68 remains closed until the dump body 11 returns to the frame 120 of the chassis 12 whereupon the said pin 71 carried by the member 130 of the said dump body 11 contacts the operating lever 680 of the said stabilizer control valve 68 and opens the same.

When the dump body 13 is at rest on the frame 120 of the chassis 12, and said stabilizer control valve 68 is opened, the moving of the hydraulic control valve 60 from its Neutral to Raise position causes hydraulic fluid under pressure to flow to both the dump body lifting cylinders 21 to lift the dump body 13 and to the stabilizer locking cylinder 50 whereupon the locking shoe 44 is forced against the locking arm 40 which locks the said locking arm 40 to the lock shaft 31 in the angular relationship it had assumed with respect to the lock arm 34 responsive to the tilting of the rear axle 20 at the time the dump body 13 has risen sufficiently from the frame 120 of the chassis 12 to permit the said stabilizer control valve 68 to close. The rear axle 20 is now locked in the angular position it assumed at the beginning of the dumping cycle of the dump body 13 of the dump trailer 11, and remains so locked until the stabilizer control valve 68 is opened by the return of the dump body 13 to the frame 120 of the chassis 12 at the end of the dumping cycle of the said dump body 13. As before pointed out, the rear axle 20 continues to float on its springs 26 during the dumping cycle of the dump body 13, but always at the lateral angle into which it is locked at the beginning of the dumping cycle of operation of the dump body 13.

When the said hydraulic locking cylinder 50 is actuated by hydraulic fluid under pressure during the dumping cycle of the dump body 13, the pressure within the said locking cylinder 50 acts upon the reciprocating piston head 54 of the hollow piston 51 of the said locking cylinder 50 and depresses the said reciprocating piston head 54 against the compression spring 55 disposed within the said hollow piston 51. This increases the volume of hydraulic fluid under pressure in the locking cylinder 50 above the volume of the said hydraulic fluid required to move the piston 51 and lock the locking arm 40 to the lock shaft 31, thus causing the locking cylinder 50 to also serve as a hydraulic accumulator.

This hydraulic accumulator function of the locking cylinder 50 maintains locking pressure on the said locking cylinder 50 while compensating for minute leakage past the stabilizer control valve 68 and the check valve 70 whenever the dump body 13 has been partially or fully raised and the control valve 60 is shifted from its Raise position to its Neutral or Lower position, thus maintaining adequate hydraulic fluid pressure in the stabilizer cylinder 50 until the fluid pressure therein is released by the opening of the stabilizer control valve 68 responsive to the lowering of the dump body 13 to the frame 120 of the chassis 12 at the end of the dumping cycle of operation of the said dump body 13.

After the dump body 13 lifted by the hydraulic cylinders 21 and the load in the dump body 13 has been dumped, the manually operated hydraulic control valve 60 is moved to its Lower position as shown in FIG. 9, hydraulic fluid from the pump 62 is pumped back to the reservoir 61 as indicated by the dotted line arrows 630 in FIG. 9, and hydraulic fluid flows during the lowering of the said dump body 13 from the hydraulic cylinders 21 back to the reservoir 61 as indicated by the full line arrows 73 in FIG. 9 from the dump cylinders 21 through the said control valve 60 to the reservoir 61. When the dump body 13 approaches its normal lowered position on the frame 120 of the chassis 12, the adjustable pin 71 carried by the dump body member 130 contacts the lever 680 of the stabilizer control valve 68 and moves the said stabilizer control valve lever 680 from its closed position shown in full lines in FIG. 8 to its open position shown in dot and dash lines therein, thereby opening the said stabilizer control valve 68 to release hydraulic fluid maintained under pressure in the hydraulic locking cylinder 50 by the hereinbefore described accumulator action of the spring loaded reciprocating piston head 54 of the hollow piston 51 of the said hydraulic locking cylinder 50.

As soon as the stabilizer control valve 68 is opened as above described, hydraulic fluid under pressure in the hydraulic locking cylinder 50 is released through the stabilizer pressure line 67 and the stabilizer control valve 68 to the main pressure line 64 as indicated by the dotted line arrows 730 in FIG. 9. Since no pressure exists in the said main pressure line 64 when the control valve 60 is in its Lower position and the stabilizer control valve 68 is opened by the return of the dump body 13 to the frame 120 of the chassis 12, hydraulic fluid under accumulator pressure released from the hydraulic locking cylinder 50 forces hydraulic fluid from the stabilizer pressure line 67 into the pressure line 64 as indicated by the dotted line arrow 7300 in FIG. 9 and back to the reservoir 61 through the said pressure line 64.

Although but one embodiment of the invention has been disclosed and described in detail in connection with the dump trailer 11 and its tractor 15, it is obvious that the invention may be applied to dump trucks and like vehicles by those skilled in the art, and that many changes may be made in the size, shape, arrangement and details of the various elements of the invention, all without departing from the spirit and scope thereof as defined by the appended claims.

I claim:

1. In a dump vehicle, a chassis including a frame, at least one wheeled rear axle, spring means supporting said frame at each side of said rear axle and connected thereto, a dump body, transversely disposed pivot means mounting the said dump body on the said chassis, and means for raising and lowering said dump body about its pivot means for accomplishing a dumping cycle, the said frame and axle being tiltable laterally with respect to each other when said vehicle is on uneven terrain, a stabilizer for eliminating any increase in lateral tilting of said axle and frame with respect to each other during each dumping cycle of said dump body comprising means pivoted on said frame including laterally spaced arms linked at one end to said rear axle, one of said arms being fixed to said pivot means and the other of said arms being journaled thereto, and means locking the other said arm to said pivot means fixing said rear axle and frame in the lateral angular relationship assumed by them with respect to each other said locking means operable responsive to the initial raising and releasable upon lowering of the dump body during each said dumping cycle.

2. In a rear dump vehicle, a chassis including a frame, at least one wheeled rear axle, spring means supporting said frame at each side of said rear axle and connected thereto, a dump body, transversely disposed pivot means mounting the rear of said dump body on the rear of said chassis, and means raising and lowering said dump body about its pivot means to accomplish a dumping cycle, the said frame and axle being tiltable laterally with respect to each other responsive to uneven deflection of said spring means supporting said frame when said vehicle is on uneven terrain, a stabilizer for eliminating any increase in lateral tilting of said axle and frame during each dumping cycle of said dump body comprising a shaft turnably mounted transversely on said frame including an arm fixed at one end to said shaft and linked at its other end to said axle at one side thereof, and a locking arm journaled to said shaft and linked at its other end to said axle at the other side thereof, locking means operable responsive to the raising of the dump body at the beginning of each dumping cycle locking said locking arm to said shaft thereby holding said axle and frame in the lateral angular position assumed by them at the beginning of each said dumping cycle, said locking means being releasable responsive to the lowering of said dump body at the end of each said dumping cycle.

3. In a dump vehicle including a chassis having at least one rear axle and a frame sprung therefrom at opposite sides thereof, a dump body and pivot means mounting the same on said frame, and means raising and lowering said dump body about its pivot means for accomplishing a dumping cycle, said dump body pivot means being so located as to increase the loading on one side of said rear axle during the dumping of said dump body when said dump vehicle is operated on uneven terrain, stabilizer means comprising a shaft turnably mounted on said frame including laterally spaced arms linked at one end to said axle, one of said arms being fixed to said turnable shaft and the other journaled thereon, and means operable responsive to the raising of the dump body locking the journaled arm to said turnable shaft thereby locking the rear axle of said vehicle into the lateral angular position assumed by it with respect to said frame at the beginning of said dumping cycle, said locking means being releasable near the end of the said dumping cycle.

4. In a dump vehicle including a chassis having at least one rear axle, a frame and spring means connected to said frame and said axle at opposite sides thereof, a dump body, a pivot mounting said dump body on said frame, said dump body normally resting on said frame, and means raising and lowering said dump body about its pivot for accomplishing a dumping cycle, said pivot being so located as to increase the loading on said rear axle during the dumping of said dump body, a stabilizer for reducing lateral tilting of said vehicle during the dumping of said dump body comprising a transverse shaft turnably mounted on said frame, arm means carried by said turnable transverse shaft adjacent each side of said chassis and linked to said rear axle, one arm means being fixed to said turnable transverse shaft and the other journaled thereon, and means operable responsive to the raising of the dump body at the beginning of a dumping cycle locking the journaled arm means to said turnable transverse shaft thereby locking the rear axle of said vehicle into the lateral angular position assumed by it in respect to said turnable transverse shaft at the beginning of the said dumping cycle.

5. In a rear dump vehicle, a chassis including a frame, at least one wheeled rear axle, spring means supporting said frame at each side of said rear axle connected thereto, a dump body, transversely disposed pivot means mounting the rear of said dump body on the rear of said chassis, the forward end of said dump body normally resting on said frame, hydraulic means including a hydraulic cylinder carried by said frame adapted to raise and lower said dump body about its transverse pivot to accomplish a dumping cycle, a hydraulic fluid pressure source and means including a manually operated control valve having a Raise, Neutral and Lower position connecting said fluid pressure source to said hydraulic cylinder to perform said dumping cycle, a stabilizer for reducing the lateral tilting of said vehicle during the dumping of said dump body comprising a transverse shaft turnably mounted on said frame including a fixed arm extending therefrom and linked to said axle at one side thereof, a locking arm including a locking shoe pivoted on said transverse shaft extending therefrom and linked to said axle at the other side thereof, and hydraulic means connected to said fluid pressure source including a power cylinder carried by said locking arm and stabilizer control valve means operable responsive to the initial raising and final lowering of said dump body during the dumping cycle after said manually operated control valve is moved sequentially to its Raise and Lower positions to actuate the said hydraulic means pivoting the said dump body through its dumping cycle, the said power cylinder moving said locking arm into locked engagement with said transverse shaft and thereby maintaining the rear axle of said vehicle in the lateral angular position assumed by it with respect to said frame at the beginning of the dumping cycle of said dump body and at least during the raising thereof, said transverse shaft remaining turnable in respect to said frame whereby to permit the springing of said frame with respect to said rear axle while said rear axle is locked in said lateral angular position.

6. Stabilizing means for dump vehicles as claimed in claim 5 wherein said stabilizer control valve means is normally spring loaded closed and is held open by the dump body when resting on said frame, said stabilizer control valve spring closing at the beginning of said dumping cycle responsive to a relatively small initial pivoting of said dump body to dump the same, and accumulator means maintaining hydraulic locking pressure on said power cylinder during the remaining portion of the raising of the dump body during dumping cycle of said dump body.

7. Stabilizing means for dump vehicles as claimed in claim 5 wherein said stabilizer control valve means is normally spring loaded closed and is held open by the dump body when resting on said frame, said stabilizer control valve spring closing responsive to a relatively small initial pivoting of said dump body when said manual control valve is moved to its Raise position and spring loaded hydraulic accumulator means incorporated in said power cylinder hydraulically actuated during the said initial pivoting of said dump body and the locking of said locking arm by said power cylinder maintaining hydraulic locking pressure in said power cylinder after said stabilizer control valve is closed and during the remaining portion of the raising of the dump body when said manual control valve is in its Raise position.

8. In a rear dump vehicle, a chassis including a frame, at least one wheeled rear axle, spring means supporting said frame at each side of said rear axle connected thereto, a dump body, transversely disposed pivot means mounting the rear of said dump body on the rear of said chassis, the forward end of said dump body normally resting on said frame, hydraulic means including a hydraulic cylinder carried by said frame adapted to raise and lower said dump body about its transverse pivot to accomplish a dumping cycle, a hydraulic fluid pressure source and means including a manually operated control valve connecting said fluid pressure source to said hydraulic cylinder to perform a dumping cycle, a stabilizer for reducing any lateral tilting of said frame and dump body thereon with respect to said axle that may occur due to uneven deflection of said spring means during the said dumping cycle comprising a transverse shaft turnably mounted on said frame including a fixed arm extending therefrom and linked to said axle at one side thereof, a locking arm including a locking shoe pivoted on said transverse shaft extending therefrom and linked to said axle at the other side thereof, and hydraulic means including a power cylinder carried by said locking arm connected to said fluid pressure source, and valve means adapted to actuate said power cylinder and lock said locking arm to said transverse shaft when said dump body is raised off said frame during at least the raising of the dump body during each dumping cycle.

9. In a dump vehicle, a chassis including a frame and at least one wheeled rear axle, spring means supporting said frame at each side of said rear axle and connected thereto, a dump body, transversely disposed pivot means mounting the rear of said dump body on the rear of said chassis, and means for raising and lowering said dump body about its pivot means for accomplishing a dumping cycle, said frame and axle tilting laterally with respect to each other when said vehicle is on uneven terrain, stabilizer means connected between the frame and the axle locking the frame in the tilted position assumed with respect to the axle at the beginning of the dumping cycle, said means locking at the beginning of the tilting of the dump body to dump the same and unlocking during the lowering of the dump body.

References Cited in the file of this patent

UNITED STATES PATENTS

| | | |
|---|---|---|
| 774,771 | Mills et al. | Nov. 15, 1904 |
| 1,581,358 | Mayer | Apr. 20, 1926 |
| 1,610,881 | Reinsch | Dec. 14, 1926 |
| 1,915,134 | MacPherson | June 20, 1933 |
| 1,975,119 | Oates | Oct. 2, 1934 |
| 2,000,229 | Heise | May 7, 1935 |
| 2,000,230 | Heise | May 7, 1935 |
| 2,020,489 | Walker et al. | Nov. 12, 1935 |
| 2,466,791 | Cook | Apr. 12, 1949 |
| 2,883,237 | Schonrock | Apr. 21, 1959 |